United States Patent [19]

Harding

[11] Patent Number: 4,548,384
[45] Date of Patent: Oct. 22, 1985

[54] TOP ENTRY METAL-SEATED BALL VALVE

[75] Inventor: Bruce L. Harding, Holden, Mass.

[73] Assignee: Smith Valve Corporation, Westboro, Mass.

[21] Appl. No.: 561,887

[22] Filed: Dec. 15, 1983

[51] Int. Cl.⁴ .............................................. F16K 5/06
[52] U.S. Cl. .................................. 251/163; 251/250; 251/315
[58] Field of Search ............... 251/163, 162, 315, 316, 251/314, 250

[56] References Cited

U.S. PATENT DOCUMENTS

| | | | |
|---|---|---|---|
| 2,847,180 | 8/1958 | Ludeman | 251/163 |
| 3,262,671 | 7/1966 | Muench | 251/163 |
| 3,475,003 | 10/1969 | Paluscek | 251/163 |
| 3,484,078 | 12/1969 | Haenky | 251/163 |
| 3,885,771 | 5/1975 | Baumann | 251/315 |
| 4,029,292 | 6/1977 | Kramer et al. | 251/163 |
| 4,260,128 | 4/1981 | Tito | 251/250 |

*Primary Examiner*—Martin P. Schwadron
*Assistant Examiner*—James R. Shay
*Attorney, Agent, or Firm*—Maurice E. Gauthier

[57] ABSTRACT

This invention relates to a ball valve having a valve body with a bonnet bore communicating with a through fluid bore. A valve seat in the valve body surrounds the fluid bore axis. A bonnet with a stem bore extending therethrough is received in the bonnet bore. An operating stem is journalled for rotation in the stem bore. A ball is connected to the stem and located in the fluid bore. The ball has a through passageway. Rotation of the stem causes the ball to rotate eccentrically between an open position at which the ball is spaced from the valve seat with its through passageway aligned with the fluid bore, and a closed position at which the ball blocks the fluid bore by being wedged into sealing engagement with the valve seat. The ball is externally contoured to provide both a clearance from the valve body to accommodate its eccentric rotation, and a stop which is engageable with the valve body to positively locate the ball in its open position. The invention also includes the aforesaid ball valve assembled in combination with an actuator having a linearly reciprocating piston mechanically connected to the valve stem by means of a rack and pinion. Linear motion of the piston is limited in one direction by the sealing engagement of the ball with the valve seat, and in the opposite direction by the engagement of the ball stop with the valve body.

6 Claims, 9 Drawing Figures

4,548,384

TOP ENTRY METAL-SEATED BALL VALVE

BACKGROUND OF THE INVENTION

1. Field of the Invention

This invention relates to a valve of the type commonly referred to as a top-entry metal-seated ball valve, as well as to the combination of said valve with an actuator specially adapted for use therewith.

2. Description of the Prior Art

There exists a long felt and heretofore unsatisfied need for a quick-acting low-cost on-off valve having the capability of achieving ANSI (American National Standard Institute) pressure-temperature ratings. Conventional gate valves, with their metal-to-metal seating and wedging action, satisfy many of these requirements. However, because a screw thread is used to force the wedging action, many turns of the operating handle are required to move the wedge between its fully open and fully closed positions. Thus, quick action becomes an impossibility with valves of this type.

Moderately priced ¼ turn ball valves also achieve many of the above-stated requirements. However, such valves lack the ability to achieve high pressure-temperature ratings because they employ resilient elastomeric seats, whose pressure retaining capabilities drop rapidly as temperatures increase.

Metal-seated ball valves also are available which again achieve many but not all of the above-stated requirements. Because such valves require extremely precise machining and assembly, their costs are extremely high and this in turn severely limits where they can be used.

SUMMARY OF THE PRESENT INVENTION

A basic objective of the present invention is to provide a new and improved top-entry metal-seated ball valve which is quick-acting, low-cost, and capable of achieving ANSI pressure-temperature ratings. A related objective of the present invention is the provision of means for adjusting the relative positions of certain valve components during their initial assembly in order to compensate for normal variations in manufacturing tolerances and thereby ensure that, when closed, the valve ball is properly wedged into sealing engagement with the valve seat. Still another related objective of the present invention is the provision of an integral stop on the valve ball which coacts internally with the valve body to positively locate the ball in its fully open position. This latter feature, in combination with the sealing engagement of the ball with the valve seat in the closed position, makes it possible to combine the valve with an improved low-cost actuator.

The foregoing objectives are achieved in a preferred embodiment of the invention to be hereinafter described in greater detail by providing a ball valve having a body with a bonnet bore leading to a through fluid bore. A circular metal valve seat in the body surrounds the fluid bore axis. A metal ball with a passageway extending therethrough is supported in the fluid bore by means of an operating stem. A bonnet in the bonnet bore has a stem bore in which the operating stem is journalled for ¼ turn rotation between a closed position at which the ball is spaced from the body interior and in sealing engagement with the valve seat to block the fluid bore, and an open position at which the ball is spaced from the valve seat and in engagement with the body interior, with its through passageway aligned with the fluid bore.

The ball is eccentrically rotated between its open and closed positions. Eccentric rotation is achieved by offsetting the rotational axis of the operating stem from both the center of the ball and the center line of the valve seat.

Eccentric rotation of the ball is accommodated by externally contouring the ball to provide adequate clearance from the body interior, the said contouring also forming an integral stop which is engageable with the valve body to positively locate the ball in its open position.

The axis of the stem bore is offset with respect to the bonnet bore. Thus, during assembly of the valve components, normal variations in manufacturing tolerances can be easily and inexpensively compensated for by rotatably adjusting the bonnet and/or stem in relation to each other in order to achieve a precise seating of the ball against the metal seat.

These and other objectives and advantages of the present invention will now be described in greater detail in connection with the accompanying drawings, wherein:

DETAILED DESCRIPTION OF PREFERRED EMBODIMENT

Figure 1:
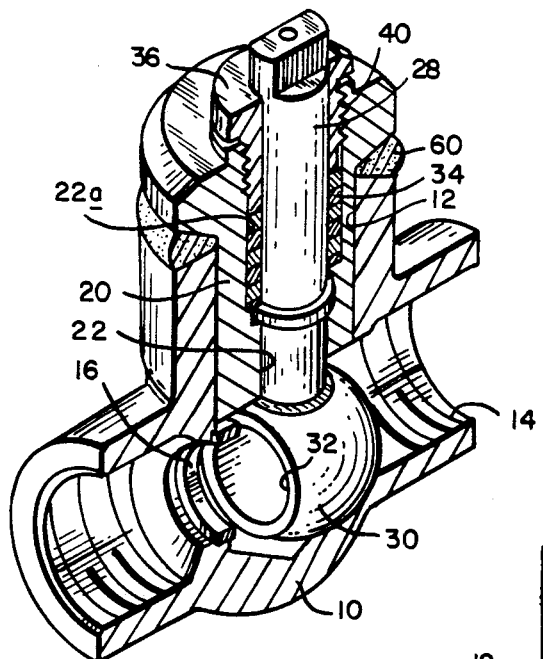
FIG. 1 is an isometric cross-sectional view of a valve in accordance with the present invention, with the ball in the open position.

Referring now to the drawings, a valve in accordance with the present invention is shown comprising a unitary body 10 having a bonnet bore 12 communicating with a through fluid bore 14. A circular metal valve seat 16 is arranged in the valve body at a location adjacent to the junction of the bonnet bore with the fluid bore. The valve seat surrounds the fluid bore axis, and the center line 18 of the valve seat is generally coincident with the fluid bore axis.

Figure 3:
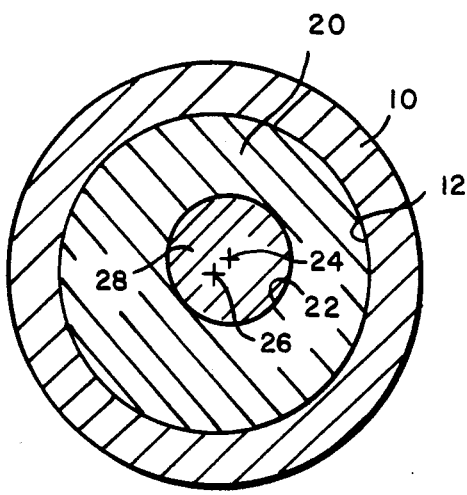
FIGS. 3 and 4 are horizontal sectional views taken respectively along lines 3—3 and 4—4 of FIG. 2.

A bonnet 20 is received in the bonnet bore 12. The bonnet has a stem bore 22 extending therethrough, with the axis 24 of the stem bore being offset from the axis 26 of the bonnet bore (see FIG. 3).

An operating stem 28 is journalled for rotation in the stem bore 22. The rotational axis of the stem is coincident with the stem bore axis, and hence both will be designated in the drawings by the same reference numeral 24. The operating stem is integrally joined at its lower end to a ball 30 located in the fluid bore 14. The ball has a passageway 32 extending therethrough. The stem bore 22 has an enlarged diameter portion 22a containing annular packing elements 34 which are compacted by a packing gland 36 threaded as at 40 into the upper end of the bonnet 20. A handwheel or the like (not shown) may be connected to the upper end of the stem 28.

Figure 4:
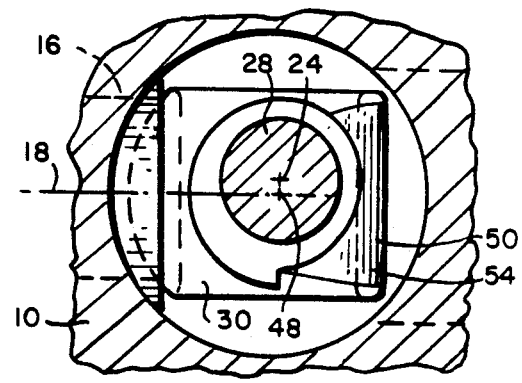

As can be best seen in FIG. 4, because of the offset of the ball center 48 from the stem axis 24, the ball will rotate eccentrically with respect to axis 24. To accommodate this offset rotation, the surface of the ball is contoured as at 50 to avoid interference with interior surfaces of the body 10. The contour 50 provides a stop 54.

Figure 2:
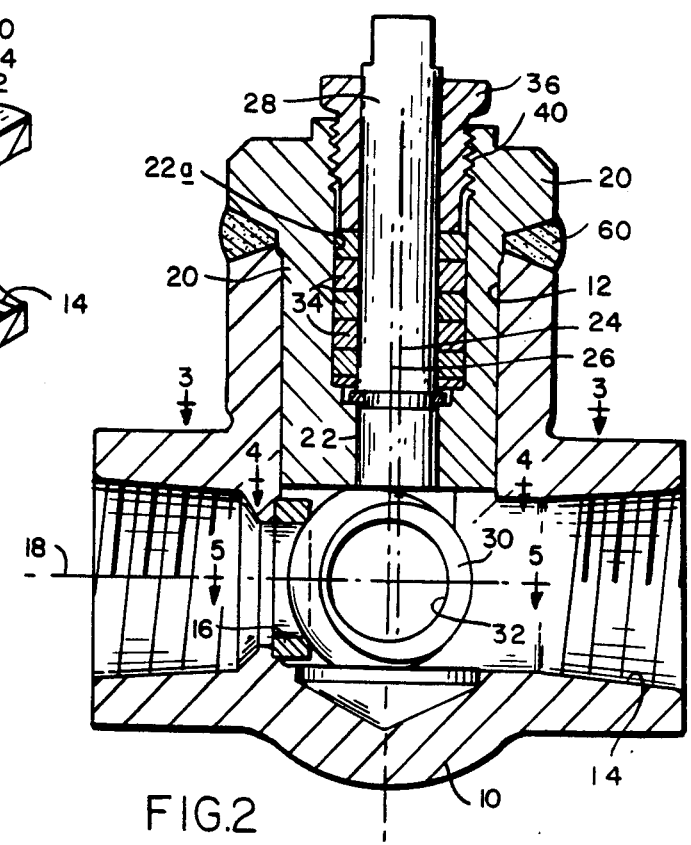
FIG. 2 is a vertical cross sectional view of the same valve, on an enlarged scale, showing the ball in the closed position.
Figure 5A:
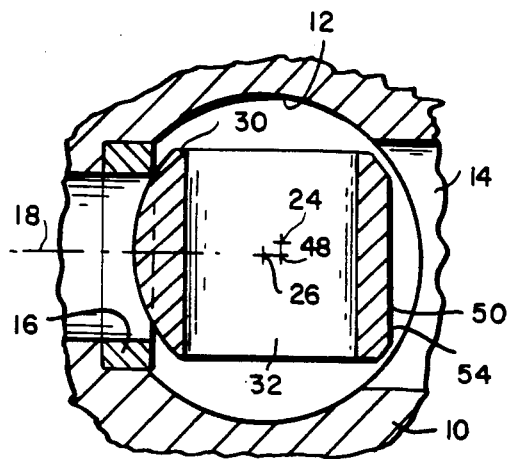
FIGS. 5A, 5B and 5C are horizontal sectional views taken along line 5—5 of FIG. 2 and respectively showing the ball in a misaligned and thus improperly closed position, a properly seated closed position, and a fully open position.
Figure 5B:
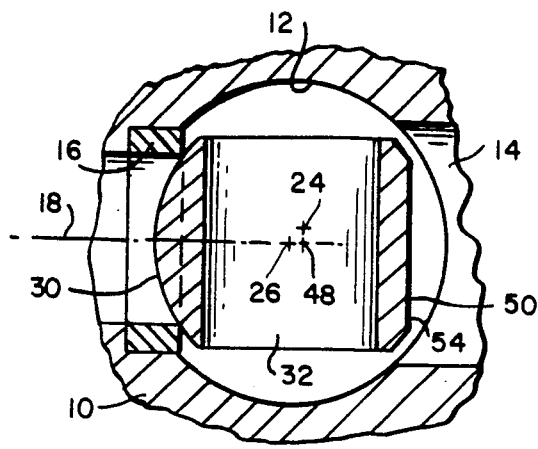
Figure 5C:
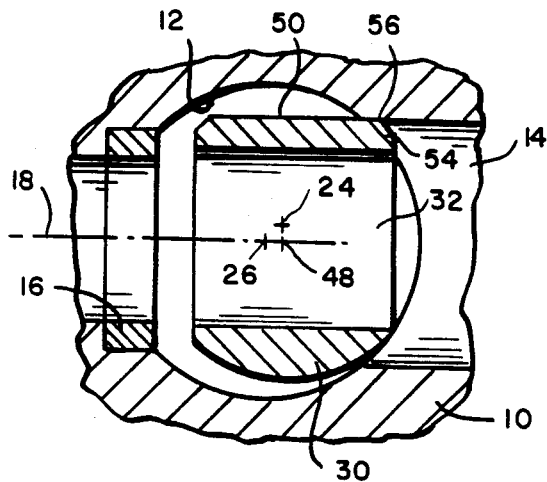

When the valve is open, as shown in FIGS. 1 and 5C, the ball 30 is spaced from the valve seat 16, with its through passageway 32 aligned with the fluid bore 14, and with the stop 54 engaging the valve body as at 56. The valve is closed by rotating the stem through a ¼ turn to eccentrically rotate the ball to the position best shown in FIGS. 2, 4 and 5B. The ball stop 54 is now spaced from the valve body and the ball is wedged into sealing engagement with the valve seat to block the fluid bore.

It thus will be seen that the valve can be rapidly operated between its fully closed and fully open positions by rotating the operating stem 28 in opposite directions through a ¼ turn. The ball 30 is positively located in the closed position by its wedged engagement with the valve seat 16, and in the open position by the engagement of stop 54 with the body at 56.

Because of variations by manufacturing tolerances, a situation might arise where the ball 30 would fail to seat properly against the valve seat 16 in the closed position. One such situation is shown in FIG. 5A, with the misalignment of the ball in relation to the seat being exaggerated for illustrative purposes. During initial assembly of the valve components, this misaligned condition can be corrected by rotating the bonnet 20 in the bonnet bore 12 and/or the stem 28 in the stem bore 22. By thus taking advantage of the dual offset relationships between the ball center 48 and stem axis 24 and between the stem axis and the bonnet bore axis 26, the ball 30 can be precisely seated against the metal seat 16, as shown in FIG. 5B. Once this has been accomplished, the bonnet 20 is fixed relative to the valve body 10, as by welding at 60. Thus, minor tolerance variations of valve components can be readily accommodated during initial assembly.

Figure 6:
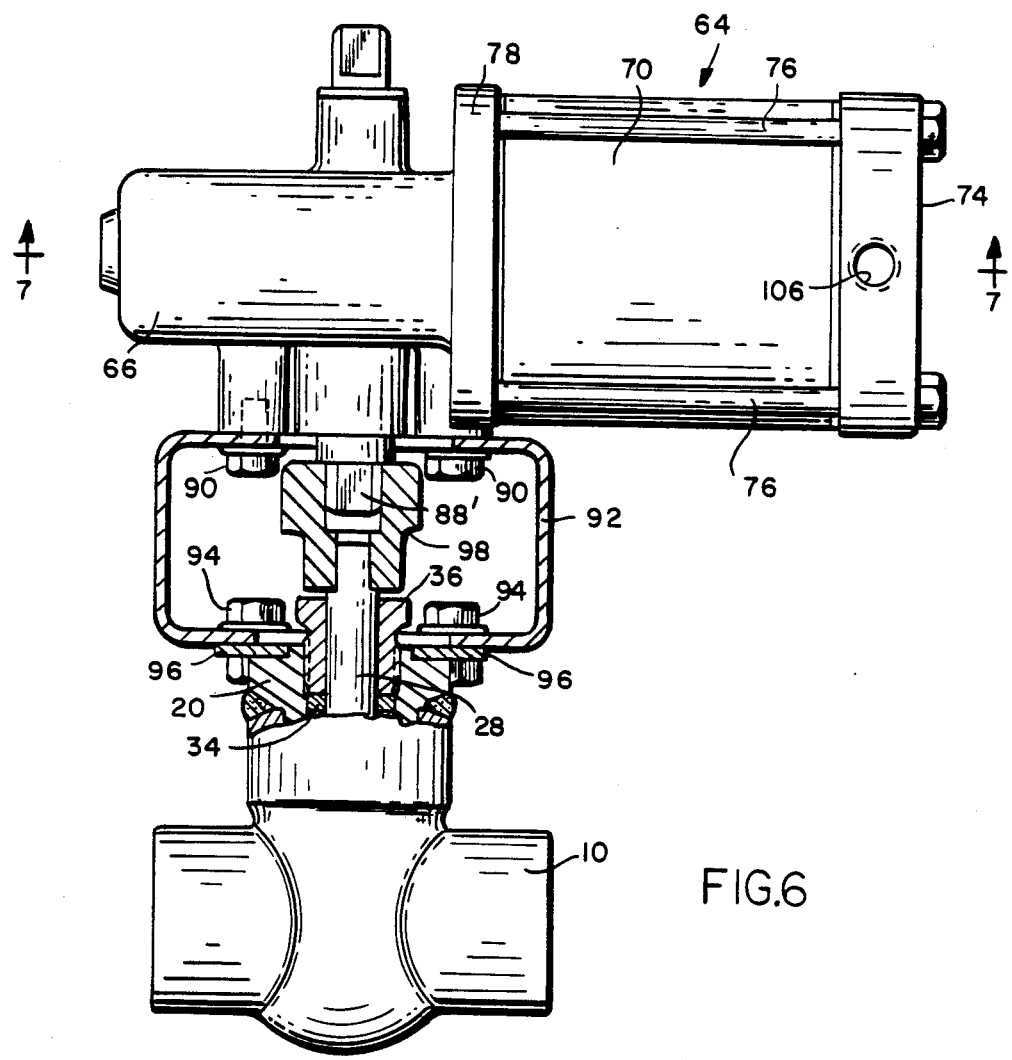
FIG. 6 is a partial sectional view showing the ball valve of the present invention assembled with a specially adapted double acting pneumatic actuator.
Figure 7:
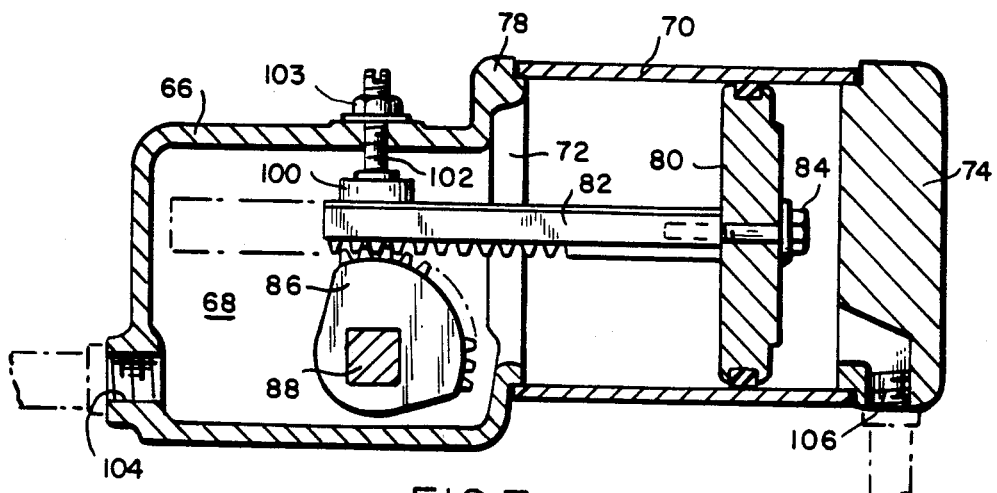
FIG. 7 is a sectional view taken along line 7—7 of FIG. 6.

Referring now to FIGS. 6 and 7, the above-described ball valve is shown assembled to a double acting pneumatic actuator 64 specially designed for use in conjunction therewith. Actuator 64 includes a housing 66 defining a gear chamber 68. A cylinder 70 communicates at one end with the gear chamber via an opening 72 in the housing. The opposite end of the cylinder 70 is closed by an end cap 74. Tie rods 76 extend through the end cap 74 and are threaded into holes in shoulder 78 on the housing 66, thereby fixing the cylinder 70 and end cap 74 relative to the housing.

A piston 80 is arranged in the cylinder 70 for reciprocating movement along the cylinder axis. A rack 82 is secured to the piston 80 by a cap screw 84. The rack is in meshed engagement with a pinion 86 carried on an output shaft 88. The output shaft is rotatable about an axis extending transversally with respect to the cylinder axis with a flat-sided end 88′ protruding externally from the gear housing 66.

The gear housing 66 is bolted as at 90 to the top of a bracket 92, the bottom of the bracket in turn being bolted as at 94 to a plate 96 on the valve bonnet 20. The shaft end 88′ protrudes downwardly through an opening in the top of the bracket where it is mechanically connected to the flat-sided upper end of the valve stem 28 by an intermediate connecting element 98 extending therebetween.

As is best shown in FIG. 7, the rack 82 is pressed into engagement with the pinion 86 by a pressure pad 100 adjustably mounted on the end of a support shaft 102 threaded through the gear housing wall. The shaft 102 is releasably fixed against rotation by a jam nut 103.

Compressed air ports 104, 106 are located respectively in the gear housing wall and the end cap 74. By appropriately controlling the admission and exhaust of compressed air through the ports 104, 106, the piston 80 and gear rack 82 can be reciprocated to rotate the pinion 86 and shaft 88. This rotation will be transmitted via the connecting element 98 to the valve stem 28 to operate the valve between its open and closed positions. The valve is in effect self locating in the open position by virtue of the ball stop 54 engaging the valve body at 56 (see FIG. 5C), as well as in the closed position by virtue of the ball being wedged against the valve seat 16 (See FIGS. 2 and 5B). Thus, there is no need to incorporate adjustable stops in the actuator to limit the extent to which the piston 80 and rack 82 can be reciprocated. This reduces costs, and simplifies the assembly and operational coordination of the valve and actuator.

I claim:

1. A ball valve comprising in combination: a valve body having a cylindrical bonnet bore communicating with a through fluid bore; an unyielding metal valve seat in said valve body surrounding the fluid bore axis; an externally cylindrical bonnet rotatably received in said bonnet bore, said bonnet having a stem bore extending therethrough; a stem rotatably received in said stem bore; a ball in said fluid bore, said ball having a through passageway and being fixed to said stem for rotation therewith, the axis of said stem bore being offset with respect to the rotational axis of said bonnet and the center of said ball being offset with respect to the rotational axis of said stem, whereupon by selected rotation of said bonnet and said stem during initial assembly of said valve, said ball may be located in a closed position against said valve seat; and means for fixing said bonnet in said bonnet bore, whereupon said ball subsequently may be operated between said closed position and an open position aligning said through passageway with said fluid bore by rotating said stem in relation to the thus fixed bonnet.

2. The ball valve of claim 1 wherein said ball is rotatably supported in said fluid bore exclusively by said stem.

3. The ball valve of claim 1 further comprising a stop on said ball which is engageable with the valve body to positively locate said ball in the open position.

4. The ball valve of claim 1 wherein said stem bore has an internal circular shelf formed between a reduced diameter portion leading to said fluid bore and an enlarged diameter portion leading to the upper end of the bonnet, said stem being rotatably journalled in said reduced diameter portion and having a circular shoulder seated on said shelf, annular packing elements encircling said stem in the enlarged diameter portion of the stem bore, and a packing gland threaded into the upper end of said enlarged diameter portion.

5. The ball valve of claim 1 wherein said bonnet is fixed in said bonnet bore by being welded to said valve body.

6. A ball valve comprising in combination: a valve body having a cylindrical bonnet bore communicating with a through fluid bore; an unyielding metal valve seat fixed in said valve body at a location surrounding the fluid bore axis; an externally cylindrical bonnet rotatably received in said bonnet bore, said bonnet having a stem bore extending therethrough; a stem rotatably received in said stem bore; a ball in said fluid bore, said ball having a stop and a through passageway and being fixed to and supported exclusively by said stem for rotation therewith within said fluid bore, the axis of said stem bore being offset with respect to the rotational axis of said bonnet and the center of said ball being offset with respect to the rotational axis of said stem, whereupon by selected rotation of said bonnet and said stem during initial assembly said valve, said ball may be located in a closed position against said valve seat; and means for fixing said bonnet in said bonnet bore, whereupon said ball subsequently may be operated between said closed position and an open position aligning said through passageway with said fluid bore by rotating said stem in relation to the thus fixed bonnet, said stop being engageable with the valve body to locate said ball in said open position.

* * * * *